(12) United States Patent
Winter et al.

(10) Patent No.: US 9,664,823 B2
(45) Date of Patent: May 30, 2017

(54) REFLECTIVE TARGET FOR SURVEYING INSTRUMENTS

(71) Applicant: Trimble Jena GmbH, Jena (DE)

(72) Inventors: Andreas Winter, Feldkirch (AT); Ute Natura, Jena (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 14/810,056

(22) Filed: Jul. 27, 2015

(65) Prior Publication Data

US 2016/0091639 A1     Mar. 31, 2016

(30) Foreign Application Priority Data

Sep. 29, 2014 (EP) ..................................... 14186787

(51) Int. Cl.
  *G02B 5/124*  (2006.01)
  *G02B 5/122*  (2006.01)
  *G01C 15/02*  (2006.01)

(52) U.S. Cl.
  CPC ............ *G02B 5/122* (2013.01); *G01C 15/02* (2013.01); *G02B 5/124* (2013.01)

(58) Field of Classification Search
  CPC ......... G02B 5/122; G02B 5/124; G01C 15/02
  USPC ......................................... 359/529–532, 546
  See application file for complete search history.

(56) References Cited

U.S. PATENT DOCUMENTS

| 3,834,789 A | 9/1974 | Brudy |
| 3,924,929 A * | 12/1975 | Holmen ................ G02B 5/124 |
| | | 359/514 |
| 4,416,509 A | 11/1983 | Milan |

FOREIGN PATENT DOCUMENTS

| JP | S60 237402 A | 11/1985 |
| JP | 2005-084458 A | 3/2005 |

OTHER PUBLICATIONS

Extended European Search Report for European Application No. 14 18 6787, issued Mar. 20, 2015, 7 pages.

* cited by examiner

*Primary Examiner* — James Phan
(74) *Attorney, Agent, or Firm* — Kilpatrick Townsend & Stockton LLP (57) ABSTRACT

Reflective target for surveying instruments having a plurality of planar reflective sections arranged to form a shape having a target axis. Each reflective section includes a plurality of prisms, each prism constituted by a corner cube having three surfaces oriented perpendicular to one another and forming a base for receiving incident light, and each of the prisms is oriented such that a common edge formed by two of the three surfaces of the prism is oriented such that the common edge and the target axis or a line parallel to the target axis lie in a common plane.

12 Claims, 7 Drawing Sheets

REFLECTIVE TARGET FOR SURVEYING INSTRUMENTS

CROSS-REFERENCE TO RELATED APPLICATIONS

This application claims priority to European Application No. 14 186 787.9, filed Sep. 29, 2014, the entire contents of which are incorporated herein by reference in their entirety for all purposes.

FIELD OF THE INVENTION

The invention relates to reflective targets for surveying instruments. In particular, the invention relates to reflective targets with multidirectional reflective properties.

TECHNOLOGICAL BACKGROUND

Reflective targets are widely used in surveying applications, such as in construction or surface mining. A reflective target may be applied to a landmark or position of interest and aimed at using a surveying instrument, such as a theodolite, having a light emitting element for emitting light such as laser light along an optical axis towards the reflective target. The surveying instrument includes an optical arrangement for receiving the reflected light from the reflective target. Based on the reflected light the optical axis of the surveying instrument may be accurately oriented towards the target. Angle measurements with respect to the target may be conducted using horizontal and vertical angle scales of the surveying instrument.

Further, the reflective target may be tracked if the target is attached to a moving object such as a machine on a construction site or other vehicle. For tracking the optical axis of the surveying instrument is continuously oriented towards the reflective target and thus follows the reflective target along its path using motorized units for adjusting the horizontal and vertical inclination of the surveying instrument.

Figure 10:
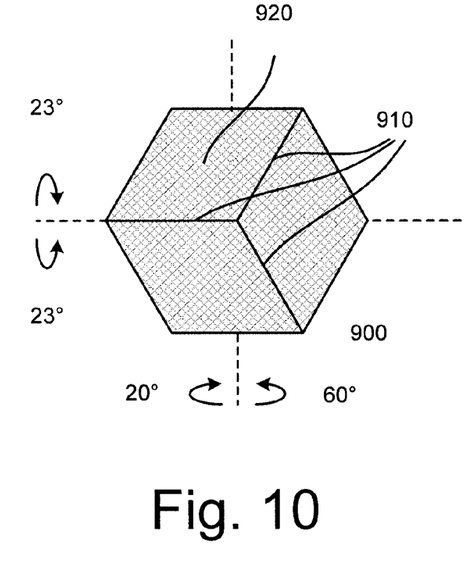
FIG. 10 schematically illustrates a prism and reflective properties thereof.

Reflective targets usually include prisms that reflect the incident light exactly in the direction of incidence. An example of a prism is shown in FIG. 10, generally denoted by reference numeral 900. The prism 900 is constituted by a section of a corner cube with its rear side defined by 3 perpendicular surfaces. Where the rear surfaces abut at each other they form three mutually perpendicular edges 910 on the rear side of the prism. The front surface of the prism, illustrated by the hatched surface denoted 920, has a hexagonal shape. Incident light entering the prism through the front surface 920 within a certain range of angles of incidence is refracted by the front surface 920 and then reflected three times, once at each of the three perpendicular surfaces. The reflected light is then again refracted at the front surface 920 and leaves the prism through the front surface 920 in exactly the same direction as it entered the prism.

The rear surfaces of the prism may be uncoated or coated with a reflective layer. If the prism is uncoated best reflection at each of the 3 perpendicular surfaces occurs if the condition for total reflection is given. If the angle of incidence of the light beam on one of the 3 perpendicular surfaces falls below the critical angle of total reflection only weak reflection occurs due to Fresnel effects. To guarantee total reflection at the 3 perpendicular surfaces the orientation of the prism may advantageously be used with following ranges of angle of incidence of the light on the front surface.

If the prism is oriented as shown in FIG. 10, with the front surface in the drawing plane, the angle range around the direction of perpendicular incidence of the light into the drawing plane, i.e. normal to the drawing plane, is approximately 20° to the left and 60° to the right, depending on the refractive index, as illustrated by the corresponding arrows in FIG. 10. Further, the useful angle range of incident light around perpendicular incidence is approximately 23° toward the top and 23° towards the bottom of the page, depending on the refractive index, as illustrated in FIG. 10.

Figure 11:
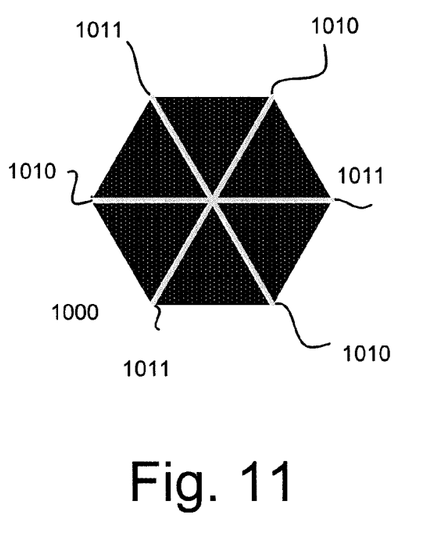
FIG. 11 shows a representation of a prism as it appears to a viewer.

FIG. 11 illustrates a photographic top view of a prism 1000. In FIG. 11 the perpendicular edges formed by the rear surfaces of the prism are denoted by reference numeral 1010. Reference numerals 1011 denote reflections of the edges of 1010 that do not have any physical representation on the side of the corner cube. The reflections of the perpendicular edges 1010 are visible when the prism 1000 is viewed from the front side.

Figure 12:
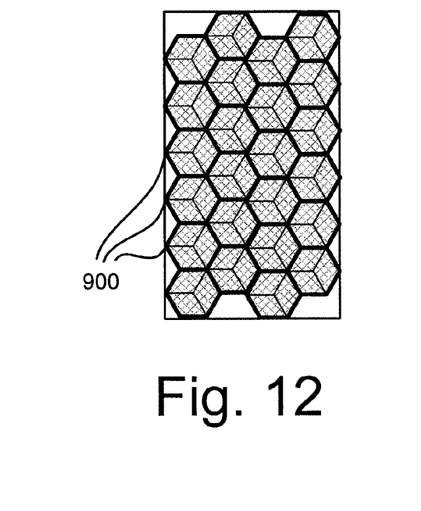
FIG. 12 illustrates an arrangement of prisms, for example of injection molded plastic.

High precision prisms generally are made of glass. Low-cost prisms usually are made of molded plastic, with a plurality of prisms arranged adjacent to one another, such as shown in FIG. 12. Arrangements of molded plastic prisms such as shown in FIG. 12 with a plurality of prisms such as prisms 900 of FIG. 10, generally are used e.g. as reflectors for vehicles and light barriers. However, the reflector shown in FIG. 12 is planar, and if the angle of incidence of the light is outside the ranges as illustrated in FIG. 10, the reflector cannot be used for measurements in surveying applications.

SUMMARY OF THE INVENTION

It is therefore desirable to provide a reflective the target for surveying applications that has a wide operational angle range.

This object of the invention is solved by the subject matter of independent claim 1. Further advantageous embodiments of the invention are disclosed in the dependent claims.

DETAILED DESCRIPTION OF THE PREFERRED EMBODIMENTS

Figure 1:
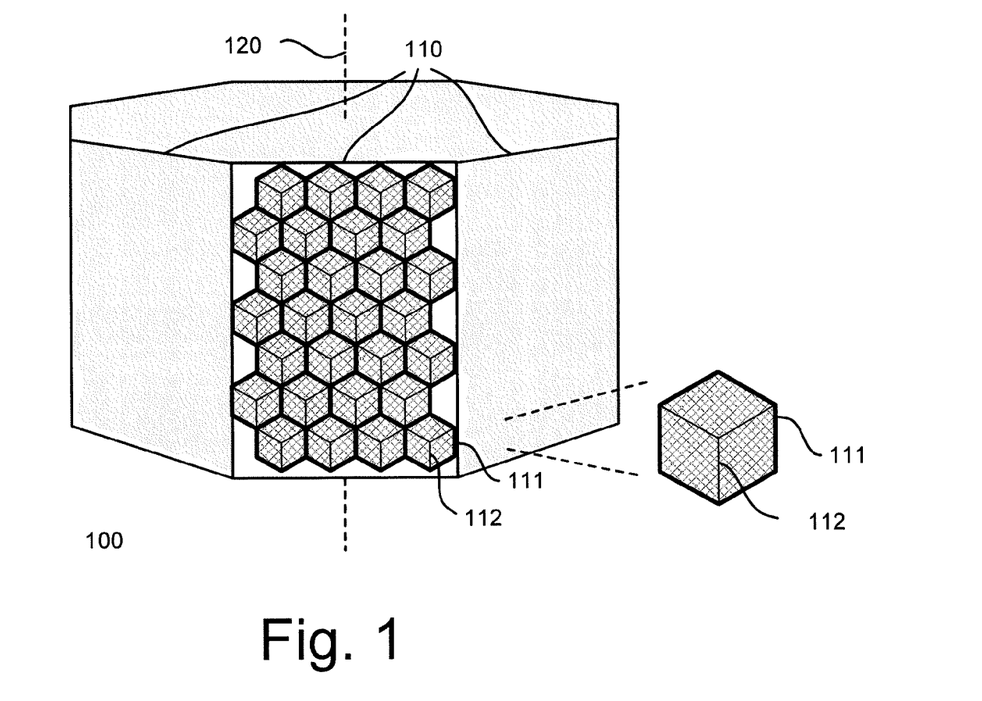
FIG. 1 illustrates a reflective target for surveying instruments according to an embodiment of the invention.

A first embodiment of the invention will be described with respect to FIG. 1. FIG. 1 illustrates a reflective target for surveying instruments according to an embodiment of the invention.

The reflective target generally denoted 100 includes a plurality of planar reflective sections 110 arranged to form a shape having a target axis 120, e.g. a cylindrical shape or section thereof, wherein each reflective section 110 includes a plurality of prisms 111. Each prism 111 is constituted by a corner cube having three surfaces oriented perpendicular to one another and forming a hexagonal base for receiving incident light. Each of the prisms 111 is oriented such that a common edge 112 formed by two of the three surfaces of the prism is oriented such that the common edge and the target axis or a line parallel to the target axis lie in a common plane. The front surface of the prisms may be parallel to the target axis, such as if the target has the shape of a cylinder.

FIG. 1 on the right-hand side illustrates a magnified portion of a prism 111 located in the reflective section 110 to further illustrate that the common edge 112 and the target axis 120 or a line parallel to the target axis lie in a common plane.

While in FIG. 1 only one of the reflective sections 110 is schematically illustrated to include prisms 111, it is understood that there the other reflective sections 110 may include the same or other patterns of prisms 111.

While in the example of FIG. 1 the reflective target is shown with an octagonal base and eight reflective sections 110, this is an example only, and other geometrical shapes of the reflective target are possible, such as cylindrical shapes with other bases, e.g. pentagonal, etc.

Moreover, while in the example of FIG. 1, the prisms 112 are shown with a hexagonal base that is advantageous for densely packing the prisms, the prisms may also have bases with any other shape, such as triangular shape, rounded shapes, etc.

Still further, while in FIG. 1 the reflective target is shown as a 360° reflective target with eight reflective sections, in other embodiments, the reflective target may only cover a section of a cylindrical shape, such as three of the reflective sections 112 shown in FIG. 1. The reflective target at least covers two non coplanar reflective sections.

Still further, the reflective target may have any other shape with a target axis, such as a generally conical shape or other polyhedral shape or respective sections thereof.

In FIG. 1 the prisms 111 are oriented such that the common edge 112 of a prism is oriented such that the common edge and the target axis 120 or a line parallel to the target axis lie in a common plane. This is generally the case if the reflective sections are parallel to the target axis, such as for the cylindrical shape of FIG. 1, however, this condition also applies if the reflective target does not in its entirety constitute a cylindrical shape but includes or constitutes a generally conical or other polyhedral shape.

It was outlined with respect to FIG. 10 that the prisms exhibit certain ranges of allowable angles of incidence of the to be reflected light, in order to exhibit the required reflective properties. With an orientation of the prisms 112 in the manner shown in FIG. 1, the prisms may be rotated around the target axis 120 of the reflective target by 23° to the left and 23° to the right relative to the normal of the reflective section. Each reflective section 110 therefore is reflective within an angular range of 46° in a rotational direction around the target axis 120.

It is therefore advantageous that the reflective target includes a number of at least eight reflective sections 110, as in this case full 360° in circumferential direction are covered by the reflective sections, without any gaps in the overall reflective properties of the reflective target in the circumferential direction. Accordingly, it is advantageous that each two neighboring reflective sections 110 are arranged in circumferential direction of the cylinder or cylinder section such of that the angle between the 2 neighboring reflective sections in circumferential direction is 45° or less. Such properties can be achieved by a cylindrical base of the reflective target having at least octagonal shape.

In FIG. 1 the orientation of the prisms 111 is such that the common edge 112 formed by two of the three perpendicular rear surfaces of the prism is in the same plane as the target axis 120. Preferably, the target axis of the reflective target, when deployed in the field, is substantially vertical, such that incoming light emitted by a surveying instrument arrives substantially perpendicular to the target axis, if the reflective target and the surveying instrument are deployed on the same elevation.

This orientation of the prisms in the reflective sections 110 does not make best use of the available space on the reflective sections 110, in particular in the edge regions of the reflective sections 110. In other words, an orientation of the prisms 111 as shown in FIG. 1 does not constitute an orientation of the prisms that would allow a maximum number of prisms 111 on the reflective sections. Nevertheless it, due to the reflective properties of the prisms 111, with 23° angular range to the left and to the right, seen from a perpendicular incidence of light, this orientation of the prisms leads to advantageous reflective properties of the reflective target 100 for surveying applications.

Figure 2A:
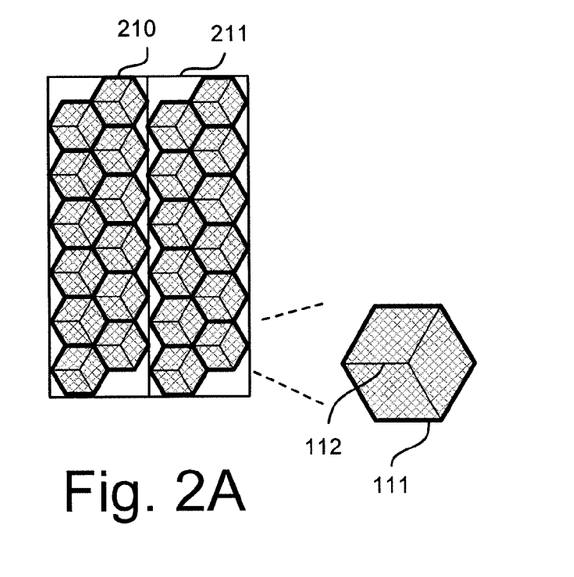
FIG. 2A illustrates a reflective target for surveying instruments, particularly illustrating reflective sections with densely packed prisms.

FIG. 2A illustrates an orientation of the prisms of 111 in 2 reflective sections 210 and 211 that makes optimum use of the available space on the reflective sections. As shown in FIG. 2A, the prisms 111 are rotated by 90° as compared to the orientation of the prisms 112 in FIG. 1, such of that the common edge 112 formed by two of the three perpendicular rear surfaces of the prism is perpendicular to the target axis 120 shown in FIG. 1. The reason for the space-saving arrangement of the prisms in the example of FIG. 2 is found in the more space-saving orientation of the hexagonal surfaces of the prisms close to the edges of the reflective sections 210, and 211.

Even though space-saving, the orientation of the prisms as shown in FIG. 2A, however, proves to be disadvantageous for a reflective target for use in surveying applications, as close to an angle of incidence of 60° the incoming beam propagation is parallel to one of the perpendicular surfaces and the beam is retroreflected only by two surfaces and not three. As a consequence, stronger reflections over a very small angular range around these 60° are caused. It has been found that this in turn causes strong deviations in distance and/or orientation measurements, if such reflecting target is used in surveying applications.

Figure 2B:
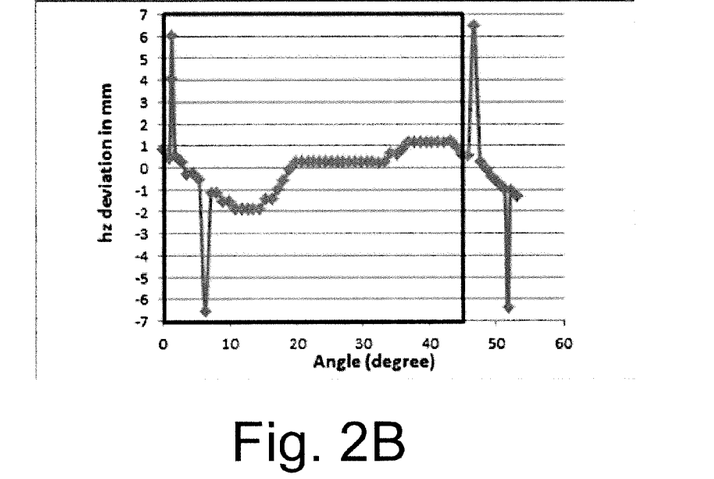
FIG. 2B illustrates horizontal position measurements using the reflective target of FIG. 2A.

FIG. 2B shows an example measurement of a reflective target including 16 reflective sections, each reflective section with two prism columns and an orientation as explained in connection with FIG. 2A, however, wherein each second reflective section has reversed orientation, i.e. is rotated by 180°, such of that the prisms in the reflective section are also rotated 180° as compared to the prisms in the respective other reflective sections. FIG. 2B shows a horizontal deviation in millimeters of a measured horizontal position from a true horizontal position of the reflective target from a distance of 10 m, denoted hz deviation in mm, depending on an angle of incidence of the measurement light onto the reflective target. It can be clearly seen that in intervals, due to the strong reflections of the prisms at an angle of 60° of incidence of the incoming light onto the prisms of the respective 16 reflective sections and the associated reflection by only two of the three surfaces the measured position in horizontal direction deviates by as much as +/−6 mm from the true position. In FIG. 2B, the interval of the strong horizontal measurement deviations is 45° (360°/16*2), which is due to the arrangement of the eight reflective sections in circumferential direction with the orientation of the prisms as shown in FIG. 2A, and eight reflective sections with respectively reversed orientation of the prisms by 180°.

For this reason the orientation of the prisms as shown in FIG. 1, with a common edge formed by two of the three surfaces of the prisms oriented in the same plane as the target axis of the reflective target, can advantageously be chosen. As can be seen in FIG. 1, close to the edges of the reflective section 110, the orientation of the prisms as shown in FIG. 1 is not the most space-saving one, as large areas as compared to the arrangement shown in FIG. 2A remain unoccupied, however, a reflective target with an arrangement of prisms oriented as shown in FIG. 1 avoids the reflective peaks as explained with respect to FIG. 2A and the corresponding deviation of the measure horizontal position of the reflective target.

Figure 3:
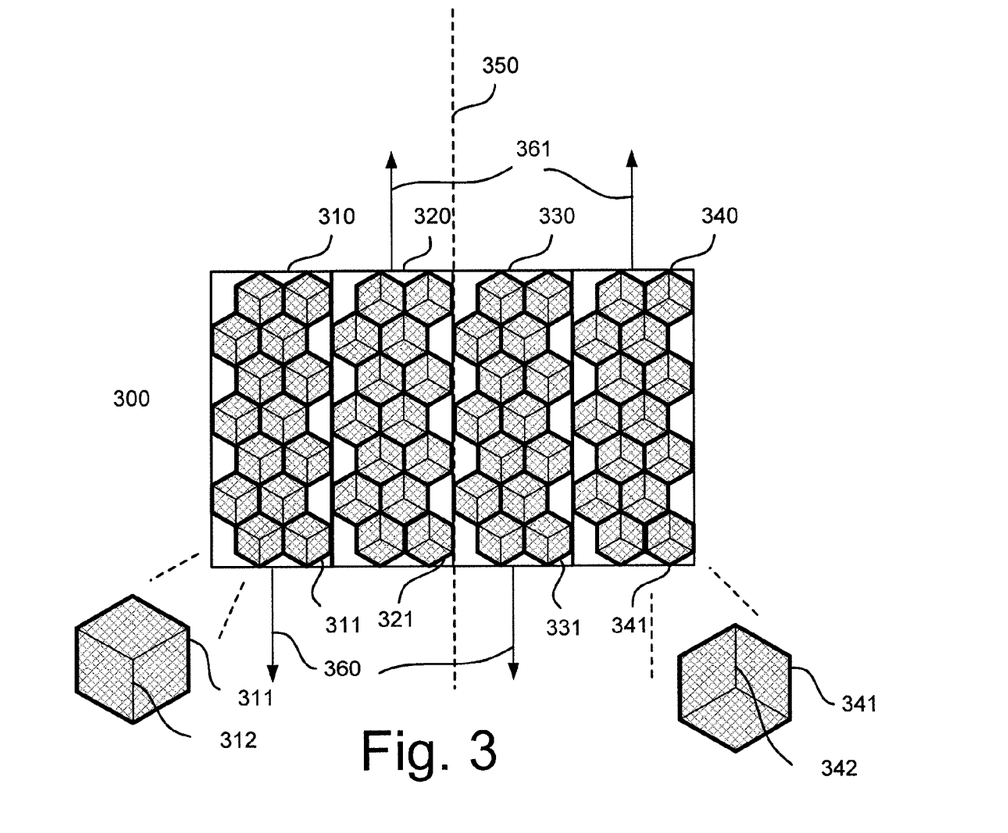
FIG. 3 illustrates a reflective target for surveying instruments according to an embodiment of the invention with a specific orientation and arrangement of prisms.

A second embodiment of the invention will now be described with respect to FIG. 3. FIG. 3 illustrates a reflective target 300 for surveying instruments according to an embodiment of the invention with another specific orientation and arrangement of prisms.

FIG. 3 schematically shows four reflective sections 310, 320, 330 and 340 of the reflective target 300. Each of the reflective sections includes two columns of prisms each having a plurality of prisms 311, 321, 331 and 341, respectively.

Even though illustrated planar in FIG. 3, the reflective sections 310, 320, 330 and 340 may form part of a cylinder or cylinder section similar to the one shown in FIG. 1, e.g. corresponding to the reflective sections 110 shown in FIG. 1. A corresponding target axis is illustrated in FIG. 3 by reference numeral 350. The reflective sections shown in FIG. 3 may form the reflective target 300, or may form part of the reflective target.

In the embodiment each prism section is formed by rows of prisms, respectively, the rows extending perpendicular to the cylinder axis 350, wherein each row of prisms consists of the same number of prisms. In the embodiment of FIG. 3, each row consists of two prisms, however, any other suitable number of prisms per row can be chosen.

In the embodiment of FIG. 3 adjacent rows of prisms in neighboring reflective sections are offset with respect to the preceding or succeeding row in the same perpendicular direction with respect to the target axis 350. Consequently, in each row of the reflective sections 310, 320, 330 and 340, due to the arrangement of the prisms, empty spaces without prisms are located at corresponding positions on the reflective sections.

In each of the reflective sections the prisms 311, 321, 331 and 341 are oriented such that a common edge formed by two of the three perpendicular rear surfaces of the prism is oriented such that the common edge and the target axis 350 or a line parallel to the target axis of the reflective target 300 lie in a common plane. FIG. 3 shows, however, two types of such parallel arrangement of these rear common edges of the prisms within the reflective sections. More precisely, the orientation of the prisms in a first type of reflective sections and second type of reflective sections is such that the common edge originating at the corner formed by the intersection of the edges formed by the three perpendicular rear surfaces in the first type of reflective sections is oriented opposite to that of the prisms of the second type of reflective sections. Moreover, in the embodiment the first type of reflective sections and the second type of reflective sections are arranged alternately in circumferential direction of the cylinder or cylinder section.

FIG. 3 correspondingly shows reflective sections 310 and 330 of the first type, and reflective sections 320 and 340 of the second type. In the reflective sections of the first type 310 and 330 the orientation of the prisms is such that the orientation of the common edge, illustrated in the schematically magnified portion as edge 312, extends in a downwards direction in the FIG. plane, as illustrated by the arrows denoted 360. In the reflective sections of the second type 330 and 340, the orientation of the prisms 341 is such that the orientation of the common edge illustrated in the schematically magnified portion as edge 342 extends in an upward direction, that is rotated by 180° as compared to the direction of the prisms in the first type of reflective sections, as illustrated by the arrows denoted 361 in the plane of the FIG. 3.

The alternate arrangement of the prisms with a first and second orientation is advantageous, if the light emitted by the surveying instrument does not impinge on the reflective target perpendicular to the target axis, such as if the elevation of the surveying instrument and the reflective target is different. As illustrated in FIG. 10, the angular range of the prism is 20° and 60° relative to a perpendicular incidence of the light onto the prism in the upward and downward direction in the plane of the figure. Accordingly, with the alternate arrangement of the prisms the 20°/60° ranges alternate, so that the reflective target has the same reflection characteristics for non-perpendicular angles of incidence of the light in upward and downward direction relative to the target axis of the reflective target.

Figure 4:
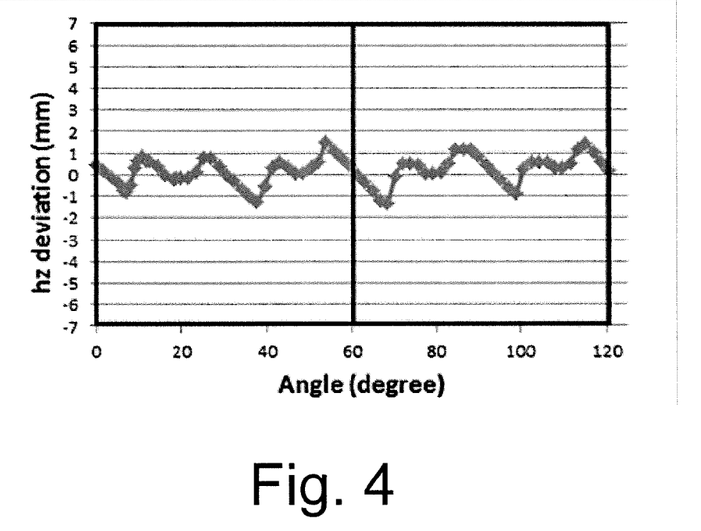
FIG. 4 illustrates horizontal position measurements using the reflective target of FIG. 3.

FIG. 4 shows an example measurement of a 360° reflective target including 12 reflective sections each with 2 prism columns and an orientation as shown in FIG. 3. Due to the orientation of the prisms with an edge formed by two of the three perpendicular rear surfaces in the same plane with the target axis, the hz deviation in millimeters of the measured position of the target from the real position from a distance of 10 m with +/−2 mm is far smaller than the deviation with the arrangement of FIG. 2A, illustrated in the measurement of FIG. 2B, due to the fact that with the arrangement of the prisms in FIG. 3 retroreflection by two surfaces as in FIG. 2 at the boundaries of the reflective ranges of does not occur.

Generally, targets are used in a range of vertical angles of +/−30° relative to horizontal direction and within this range of angles retroreflection by two surfaces does not occur.

It is, however, explicitly noted that in the embodiment of FIG. 3 the orientation of the prisms may not be alternate but the same.

In an alternative to the arrangement shown in FIG. 3 the orientation of the prisms in all reflective sections of the reflective target is the same, with the common edge formed by two of the three surfaces of the prism oriented towards a bottom portion of the reflective target, as illustrated in FIG. 1.

Such orientation of the prisms is particularly advantageous if the reflective target is used in applications with a surveying instrument where the surveying instrument is arranged on a higher elevation above the reflective target. As noted with respect to FIG. 10, the angular range of the prism is 60° relative to a perpendicular incidence of light onto the prism if in the light is incident from the right side in FIG. 10.

Moreover, such orientation of the prisms is advantageous for such angles of incidence of light onto the reflective target from upward directions, if the prisms of the reflective target are coated on the rear surfaces. Namely, if the reflective targets are coated, the two common edges other than the common edge formed by two of the three perpendicular surfaces that lies in the same plane as the target axis, cause reflective peaks at angles of light incidence around 70° from horizontal sideward directions, i.e. from the left and right side in the figure plane of FIG. 1. For non horizontal angles of incidence this angle changes and the effect of the reflective peaks is progressively mitigated and eventually eliminated if the light is incident from gradually increasing angles from the upside direction of the target, e.g. the top in FIG. 1, if the prisms are oriented as shown in FIG. 1, and is progressively increased if the light is incident from gradually decreasing angles from the downside direction of the target, with the common edge formed by two of the three surfaces of the prism oriented towards a bottom portion of the reflective target.

In a further alternative embodiment, the orientation of the common edge formed by two of the three surfaces of the prisms is oriented towards a top portion of the reflective the target, thus opposite to the preceding embodiment, for surveying applications where the surveying instrument is located at a lower elevation at the end of the reflective target, so that the measurement light from the surveying instrument is incident on the reflective target from a downward direction. Such orientation of the prisms is advantageous for the same reasons as outlined before in connection with a mitigated or eliminated reflective effect at angles of incidence of the measurement light of around 70° from sideward directions.

Figure 5:
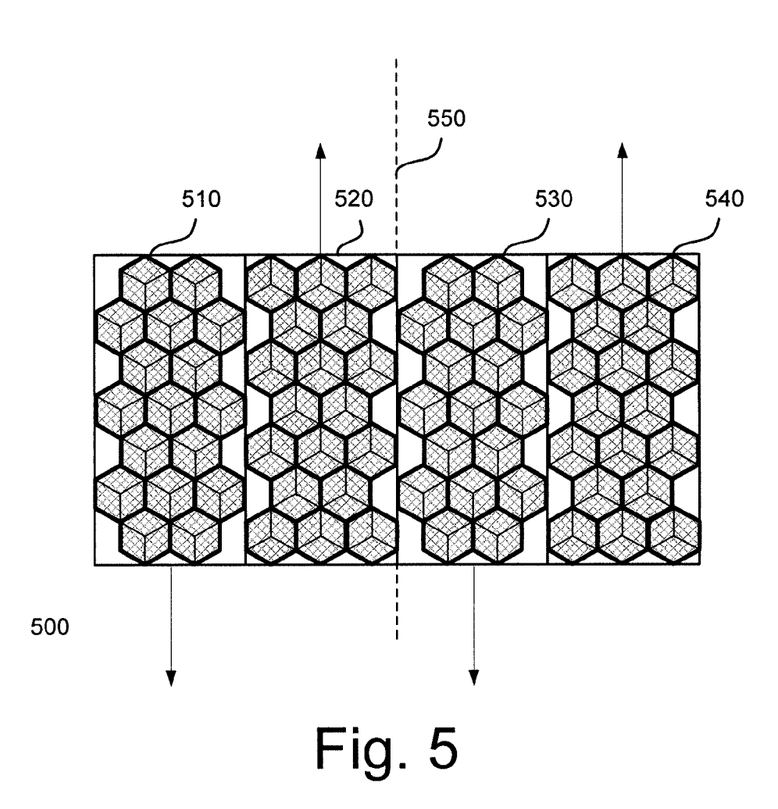
FIG. 5 illustrates a reflective target for surveying instruments according to an embodiment of the invention with another specific orientation and arrangement of prisms.

A further embodiment of the invention will now be described with respect to FIG. 5. FIG. 5 shows a reflective target 500 for surveying instruments according to a further embodiment of the invention.

FIG. 5 illustrates a reflective target 500 including four reflective sections 510, 520, 530 and 540, similar to FIG. 3. Also as in FIG. 3, the reflective sections are of a first type and a second type, provided with prisms in neighboring section having alternatingly reversed orientation compared to the target axis 550, as is was already outlined with respect to FIG. 3. The four reflective sections may form the reflective target or a part thereof.

In the embodiment of FIG. 5, each reflective section is formed by rows of prisms, the rows being perpendicular to the target axis 550, the rows in one reflective section alternately consisting of an even and an odd number of prisms, and wherein a row with an even number of prisms in a reflective section is adjacent to a row with an odd number of prisms in a neighboring reflective section.

In the embodiment of FIG. 5 the reflective sections 510 and 530 of the first type include a first row having two prisms, followed by a second row having three prisms, again followed by a row having two prisms, and so on. Conversely, the reflective sections of the second type 520 and 540 include a first row having three prisms, followed by a second row having two prisms, again followed by a row with three prisms, and so on.

The arrangement of the prisms in the reflective sections leaves small areas at the edges of the respective sections unoccupied by prisms, which is due to the geometrical arrangement constraints of the prisms in the reflective sections.

Compared to the number of prisms within the reflective sections, the overall unoccupied area of a reflective section is smaller than in FIG. 3.

Figure 6:
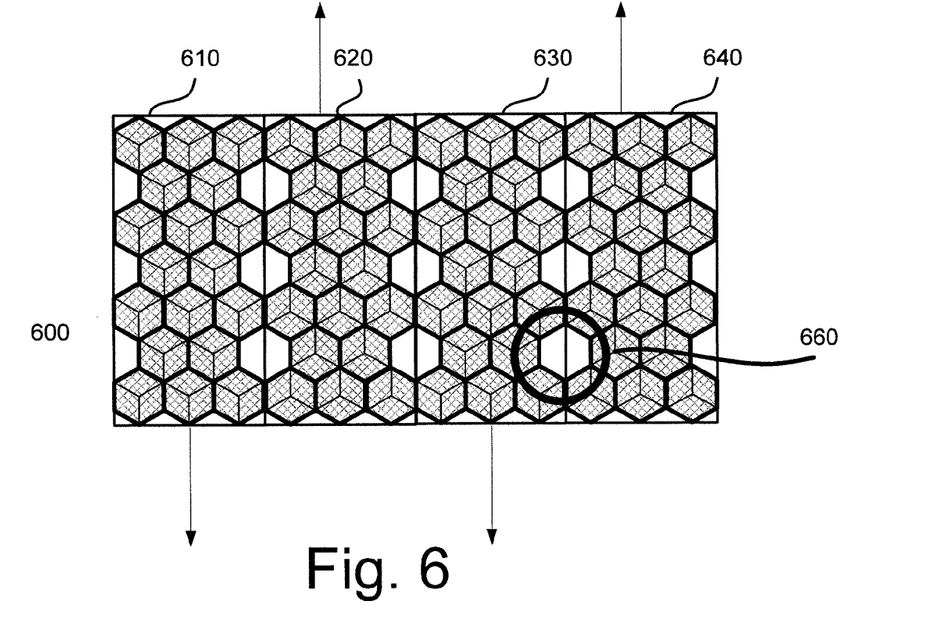
FIG. 6 illustrates a reflective target for surveying instruments according to an embodiment of the invention with another specific orientation and arrangement of prisms.

A further embodiment of the invention will now be described with respect to FIG. 6. FIG. 6 shows a reflective target 600 for surveying instruments according to a further embodiment of the invention.

FIG. 6 illustrates four reflective sections 610, 620, 630 and 640, similar to FIGS. 3 and 5. Also as before, the reflective sections are of a first type and a second type, provided with prisms in neighboring section having alternately reversed orientation.

In the embodiment of FIG. 6, each reflective section is formed by rows of prisms, the rows being perpendicular to a target axis, the rows in one reflective section alternately consisting of an even and an odd number of prisms, and wherein adjacent rows of prisms in a neighboring reflective section include both an even number of prisms or include both an odd number of prisms.

In the embodiment of FIG. 6 the reflective sections of the first and second type include a first row having three prisms, followed by a second row having two prisms, again followed by a row with the three prisms, and so on. Due to the specific arrangement of the prisms in the rows in the reflective sections, hexagonal empty spaces, such as the denoted 660, without being occupied by prisms exists at the edges of the reflective sections. Due to the geometry of the prisms in the reflective sections, however, these empty spaces cannot be itself filled with prisms that would reach over the boundary of the reflective sections into the neighboring reflective section.

Compared to the number of prisms within the reflective sections, the overall unoccupied area of a reflective section is smaller than in FIG. 5.

Figure 7:
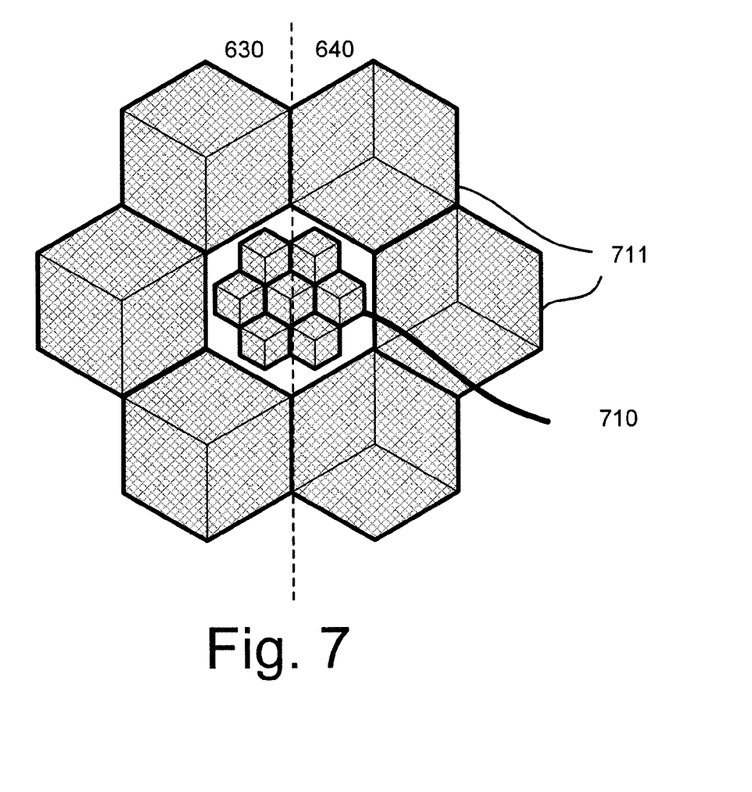
FIG. 7 illustrates a reflective target for surveying instruments according to an embodiment of the invention, particularly illustrating use of unoccupied space by arranging mini prisms therein.

A further embodiment of the invention will now be described with respect to FIG. 7. FIG. 7 illustrates a reflective target for surveying instruments according to a further embodiment of the invention, such as target 600 of FIG. 6.

The specific arrangement of the prisms in the adjacent reflective sections of the embodiment of FIG. 6 leaves for small areas close to the edge sections of the reflective sections unoccupied by prisms. Due to the specific arrangement of the prisms these unoccupied areas are adjacent to one another, having a hexagonal shape with the surface of a prism, as indicated by reference numeral 660.

However, due to the differing three-dimensional shapes of the prisms in neighboring sections with alternate orientation of the common edges to the target axis, such an area cannot be filled by a single prism.

Instead, as shown in FIG. 7, in the embodiment of FIG. 7 these remaining empty spaces of the reflective target are occupied by a plurality of smaller sized mini prisms 710.

Thus, the spaces at the edges of the reflective sections that do not include prisms due to the offset of the rows of prisms according to FIG. 7 include mini prisms 711 of smaller size compared to the prisms. The mini prisms 711 may have the same orientation as in one of the neighboring reflective sections 630 or 640, or may have differing orientation. It is also possible that in an alternating fashion the mini prisms in one of the empty spaces, such as empty space 600 in FIG. 6, exhibits one common orientation, and many prisms in another one of the empty spaces exhibit the other, the reversed orientation.

To further improve the reflective properties of the combination of prisms and many prisms as shown in FIG. 7, the mini prisms can be arranged closer to the target axis than the neighboring ones of the plurality of prisms, denoted 711.

According to further embodiments also the empty spaces that exist in the further described embodiments, such as the embodiments described with respect to FIGS. 1, 3 and 5, are filled with mini prisms as in the embodiment of FIG. 7.

Figure 8A:
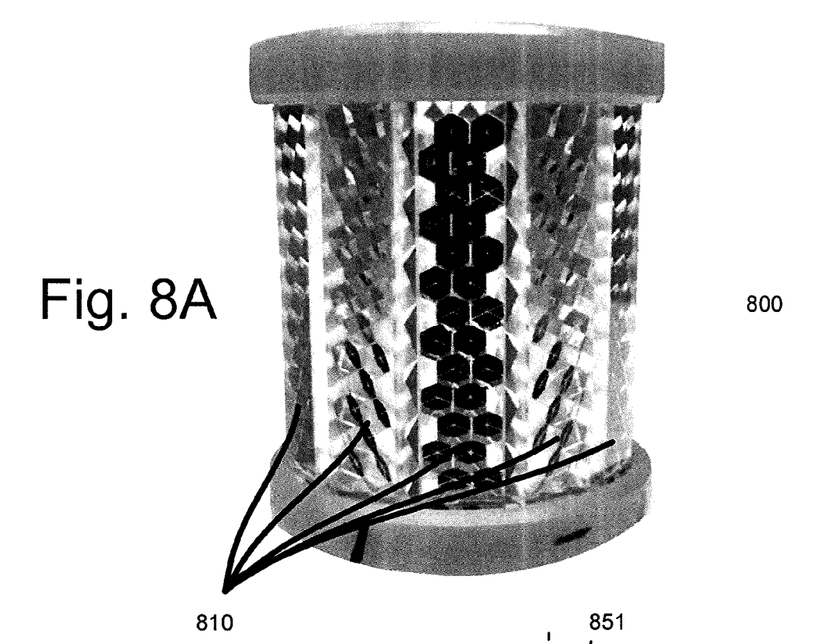
FIG. 8A illustrates a cylindrical reflective target for surveying instruments according to an embodiment of the invention.

A further embodiment of the invention will be described with respect to FIG. 8. FIG. 8 illustrates a reflective target 800 according to a further embodiment of the invention.

The reflective target 800 includes 12 reflective sections, each including 2 columns of prisms. Other arrangements of the prisms as described in the further preceding embodiments are possible. The prisms in the neighboring sections may be arranged as outlined with respect to the previous embodiments, with the same orientation or reversed orientation in respect of the neighboring reflective sections. While the reflective sections in the embodiment of FIG. 8 include rows with each 2 prisms, any other number of prisms per row in the reflective sections is possible, such as outlined with respect to previous embodiments.

Figure 8B:
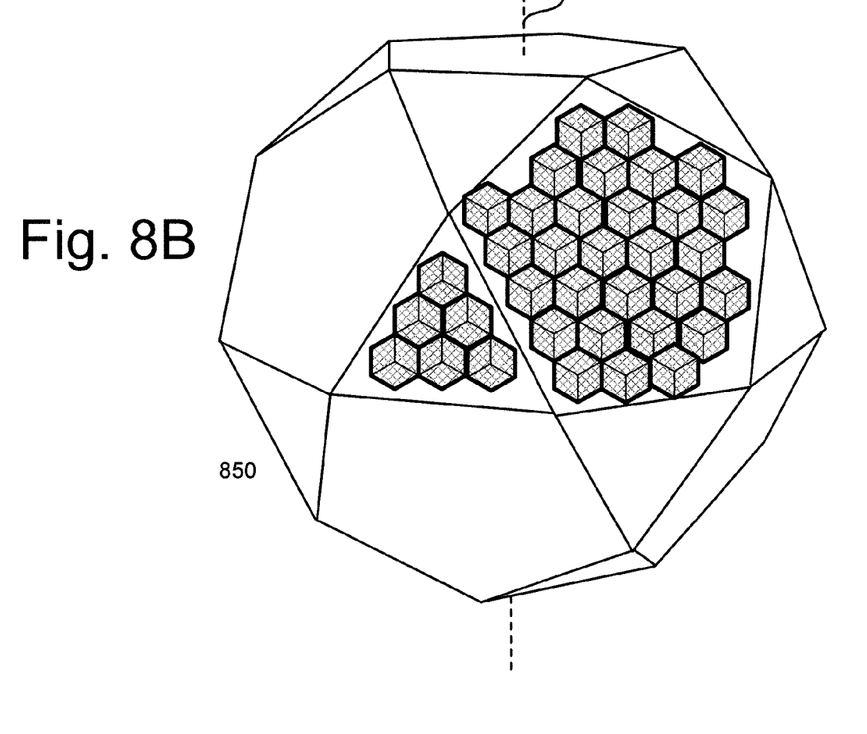
FIG. 8B illustrates an example of a polyhedral reflective target for surveying instruments according to an embodiment of the invention.

FIG. 8B illustrates a reflective target 850 according to another embodiment of the invention.

The reflective target of the embodiment of FIG. 8B has a polyhedral shape with hexagons and triangles alternately arranged on a sphere. The orientations of the prisms in respectively neighboring sections may be the same or alternate, as was outlined with respect to preceding embodiments. For demonstration purposes in FIG. 8, only two reflective sections are illustrated to include prisms, however, it is understood that the remaining sections are also be occupied by prisms.

Further, in the embodiment of FIG. 8 the common edge formed by two of the three surfaces of the prism is oriented such of that a straight line, including the common edge intersects with the target axis 851.

Other geometrical shapes wherein the reflective sections are constituted by at least one of rectangles, triangles, hexagons, octagons or pentagons are possible in further embodiments of the invention. Generally, the reflective sections may be constituted by any shape, at least including at least one of rectangles, triangles, hexagons, octagons or pentagons.

A further embodiment of the invention will be described with respect to FIG. 9.

Figure 9:
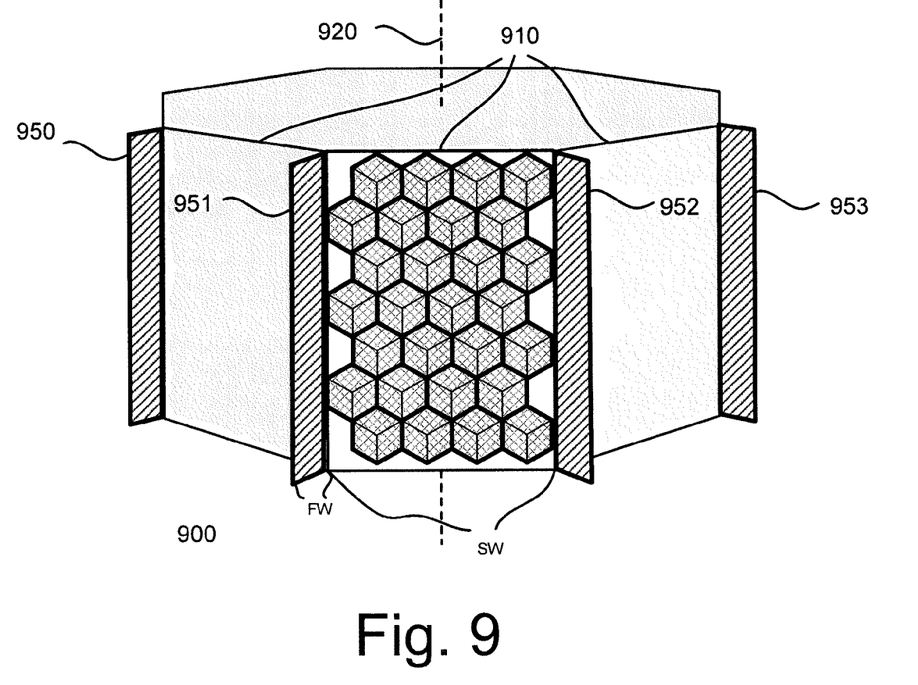
FIG. 9 illustrates a reflective target for surveying instruments according to an embodiment of the invention.

FIG. 9 illustrates a reflective target 900. The reflective target 900 includes the reflective sections 910 and a target axis 920, similar to the embodiment shown in FIG. 1. The orientation of the prisms in the reflective sections 910 is as outlined with respect to the preceding embodiments, that is, with a common edge formed by two of the three perpendicular rear surfaces in the same plane as the target axis. The common edges of the prisms in the sections may be all oriented in the same direction, such as shown in the illustrated reflective section in FIG. 9, or alternatingly, as for example described with respect to FIG. 3.

As noted above, with respect to the alternative embodiment of the FIG. 3, particularly if the prisms of the reflective target are coated on the rear surfaces, metal reflection occurs and hence the two common edges other than the common edge formed by two of the three perpendicular surfaces that lies in the same plane as the target axis, cause reflective peaks at angles of light incidence around 70° from sideward directions, i.e. from the left and right side in the figure plane of FIG. 9.

In order to avoid that the measurement light from the surveying instrument is incident on the prisms of the reflective target at such angles of around 70° from sideward directions, shielding fins may be provided between the reflective sections, of which shielding fins 950, 951, 952 and 953 are illustrated. The shielding fins preferably extend radially from the target axis and are arranged between neighboring reflective sections 910 to shield lateral incident light, such as lateral incident light with angles of incidence of around 70° from the left or the right in the figure plane with respect to a perpendicular incidence of light onto the target plane.

The shielding fins may be attached to the reflective sections or to an external structure provided around the target, such as a mesh or cage surrounding the target.

In order to effectively shield measurement light from being incident on the prisms at angles that cause reflective peaks, while avoiding excessive shadowing of light, as this decreases the overall reflectivity of the reflective target, the width of the shielding fins may be selected such that at an angle γ of incidence at which the reflective peaks occur, such as 70° from the left or the right side of the light onto the reflective section with respect to a normal direction perpendicular to the reflective section the shielding fin shields all prisms from being irradiated.

In such a further advantageous embodiment the width FW of the shielding fins avoid the reflective peaks at all prisms of the reflective sections neighboring the shielding fins can be determined as $$WF = \frac{s}{\tan(\gamma)} * \left[ \cos\left(\frac{180°}{N}\right) + \frac{\sin\left(\frac{180°}{N}\right)}{\left(\tan\left(\gamma - \frac{180°}{N}\right)\right)} \right]$$

with
S—width of the reflective sections
N—number of reflecting sections
WF—width of the shielding fins
γ—the angle of the occurrence of the reflective peaks.

For larger numbers of reflective sections the width WF can be approximated as the width S of the reflective sections divided by the tangent of γ, tan(γ), being the angle of the occurrence of the reflective peak.

In further embodiments, is the advantageous effect can already be achieved that, if the width of the fins is within a range defined by 0.5 to 1.2 times the width of the reflective sections divided by the tangent of γ.

According to further embodiments, the prisms may be formed by injection molded plastic or glass components. Molded plastic components are particularly suitable for low-cost manufacturing of reflective sections including prisms as outlined with respect to the preceding embodiments. Due to shrinking processes prisms made of injection molded plastic can only be manufactured up to a certain size. However, if a large number of such prisms is provided on the reflective sections, the disadvantage of reduced accuracy of plastic molded prisms leads in turn to improved omni-reflective properties, as the contributions of the individual prisms to the reflected light smoothen out deviations in the horizontal measurements of the reflective target from a surveying instrument.

According to still further embodiments, the prisms may be coated on the rear surfaces by reflective material, in order to improve the reflective properties.

According to still further embodiments of the reflective sections may be arranged in a sealed translucent cylinder, enabling water resistant or waterproof properties.

According to another embodiment a reflective target for surveying instruments is provided, including a plurality of planar reflective sections arranged to form a shape having a target axis, wherein each reflective section includes a plurality of prisms, each prism constituted by a corner cube having three surfaces oriented perpendicular to one another and forming a base for receiving incident light, and each of the prisms is oriented such that a common edge formed by two of the three surfaces of the prism is oriented such that the common edge and the target axis or a line parallel to the target axis lie in a common plane.

In a modification of the reflective target the orientation of the prisms in all reflective sections is the same, with the common edge formed by two of the three surfaces of the prism oriented towards a bottom portion or a top portion of the reflective target.

The invention claimed is:

1. Reflective target comprising:
    a plurality of planar reflective sections arranged around a target axis in a circumferential direction, wherein:
        each reflective section includes a plurality of prisms, each prism constituted by a corner cube having three surfaces oriented perpendicular to one another and forming a base for receiving incident light, each prism being oriented such that a common edge formed by two of the three surfaces of the prism is substantially parallel to the target axis;
        each reflective section is of a first type or a second type, wherein the plurality of prisms in a reflective section of the first type has a first orientation of the common edge, and the plurality of prisms in a reflective section of the second type has a second orientation of the common edge opposite to the first orientation; and
        the first type of reflective sections and the second type of reflective sections are arranged alternatively in the circumferential direction.

2. Reflective-target of claim 1, wherein each reflective section is formed by rows of prisms, the rows being perpendicular to the target axis, wherein each row of prisms consists of the same number of prisms, and wherein adjacent rows of prisms in neighboring reflective sections are offset with respect to the preceding or succeeding row in the same direction.

3. Reflective target of claim 1, wherein each reflective section is formed by rows of prisms, the rows being perpendicular to the target axis, wherein the rows in one section alternately consist of an even and an odd number of prisms, and wherein a row with an even number of prisms in a reflective section is adjacent to a row with an odd number of prisms in a neighboring reflective section.

4. Reflective target of claim 1, wherein each reflective section is formed by rows of prisms, the rows being perpendicular to the target axis, the rows in one reflective section alternately consisting of an even and an odd number of prisms, and wherein adjacent rows of prisms in a neighboring reflective section include both an even number of prisms or include both an odd number of prisms.

5. Reflective target of claim 1, wherein the reflective sections are arranged in the circumferential direction such that an angle between normals of two neighboring reflective sections is 45 degrees or less.

6. Reflective target of claim 1, wherein spaces at the edges of the reflective sections that do not include prisms due to the offset of the rows of prisms include mini prisms of smaller size than the prisms.

7. Reflective target of claim 6, wherein the mini prisms are arranged closer to the target axis than the neighboring ones of the plurality of prisms.

8. Reflective target of claim 1, wherein the reflective sections are constituted by any shape including at least one of rectangles, triangles, hexagons, octagons or pentagons.

9. Reflective target of claim 1, wherein the rear surfaces of the prisms are coated and including shielding fins extending radially from the target axis and arranged between neighboring reflective sections to shield lateral incident light.

10. Reflective target of claim 9, wherein the width of the shielding is determined by $$WF = \frac{S}{\tan(\gamma°)} * \left[ \cos\left(\frac{180°}{N}\right) + \frac{\sin\left(\frac{180°}{N}\right)}{\left(\tan\left(\gamma° - \frac{180°}{N}\right)\right)} \right]$$

with
S—width of the reflective sections
N—number of reflecting sections
WF—width of the shielding fins; and
γ—the angle of the occurrence of the reflective peaks,
or
is within a range defined by 0.5 to 1.2 times the width WF.

11. Reflective target of claim 1, wherein the prisms are formed by injection molded plastic or glass components.

12. Reflective target of claim 1, wherein the reflective sections are arranged in a sealed translucent cylinder.

* * * * *